United States Patent [19]

Steinmetz et al.

[11] 3,861,005

[45] Jan. 21, 1975

[54] CATALYTIC ISOMERIZATION OF LUBE STREAMS AND WAXES

[75] Inventors: Ib Steinmetz, Wilmington, Del.; David S. Barmby, Media, Pa.

[73] Assignee: Sun Oil Company of Pennsylvania, Philadelphia, Pa.

[22] Filed: Oct. 9, 1973

[21] Appl. No.: 404,822

Related U.S. Application Data

[63] Continuation-in-part of Ser. Nos. 828,746, May 28, 1969, Pat. No. 3,658,689, and Continuation-in-part of Ser. No. 246,737, April 24, 1972, Pat. No. 3,764,516.

[52] U.S. Cl. ............... 208/111, 208/27, 260/683.65
[51] Int. Cl. ..... C07c 5/22, C10g 35/06, C10g 41/00
[58] Field of Search ..................... 208/18, 111, 27; 260/683.65

[56] References Cited
UNITED STATES PATENTS

| | | | |
|---|---|---|---|
| 3,146,279 | 8/1964 | Gallagher | 260/683.65 |
| 3,308,052 | 3/1967 | Ireland et al. | 208/27 |
| 3,365,390 | 1/1968 | Egan et al. | 208/18 |
| 3,400,072 | 9/1968 | Tung et al. | 208/120 |
| 3,438,887 | 4/1969 | Morris et al. | 208/18 |
| 3,492,218 | 1/1970 | Collier et al. | 208/27 |
| 3,494,854 | 2/1970 | Gallagher et al. | 208/59 |
| 3,790,472 | 2/1974 | White | 208/111 |

Primary Examiner—Delbert E. Gantz
Assistant Examiner—G. E. Schmitkons
Attorney, Agent, or Firm—George L. Church; J. Edward Hess; Barry A. Bisson

[57] ABSTRACT

Waxy hydrocarbons, per se or in a petroleum fraction in the lubricating oil viscosity range, can be converted to oily, non-waxy hydrocarbons by contacting the wax or wax containing stream with an acidic aluminosilicate zeolite catalyst (e.g., CeHY, GdHX, CaHX, MgHY, NiHY, etc.) preferably in combination with a hydrogenation catalyst (e.g., Ni, Co, Mo, W, Pt, Pd, Re, Ru, etc.) and combinations thereof (e.g., NiCo, NiW, CoMo, NiMo, etc.). The preferred conditions include temperatures above 300° F and elevated hydrogen pressure (e.g., 400–6,000 psi, more preferred at least 1,500 psi of hydrogen), the most preferred hydrogen purity being 50–100%). Preferably, the zeolite contains polyvalent metal cations, is virtually free from alkali metal cations and halide ions and can contain in the range of 0.0–18% $H_2O$ (preferably 1–10%, typically 1.5–5%) as determined by ignition analysis at 1,800° F. A preferred feed stock is a waxy "heavy gas oil," of the type used as a charge to a lube oil hydrocracking process (e.g., see U.S. Pat. No. 3,663,427 issued May 16, 1972 to Thomas and the said Steinmetz); however, "wax-free" naphthenic lubes can also be converted to improve yields of lower viscosity lubes.

24 Claims, No Drawings

CATALYTIC ISOMERIZATION OF LUBE STREAMS AND WAXES

CROSS REFERENCE TO RELATED APPLICATIONS

This application is a continuation-in-part of our applications Ser. No. 828,746 filed May 28, 1969 now U.S. Pat. No. 3,658,689 issued Apr. 25, 1972 and Ser. No. 246,737 filed Apr. 24, 1972 now U.S. Pat. No. 3,764,516 issued Oct. 9, 1973, said applications (and the following patents and applications) being incorporated herein by reference: Ser. No. 716,190 filed Mar. 26, 1968; Ser. No. 211,040 filed Dec. 22, 1971 now U.S. Pat. No. 3,839,228 issued Oct. 1, 1974; U.S. Pat. No. 3,624,173 issued Dec. 30, 1971 and U.S. Pat. No. 3,655,813 issued Apr. 11, 1972, all of Francis W. Kirsch, the said David S. Barmby and John D. Potts; Ser. No. 185,615 filed Oct. 1, 1971 of Alfred E. Hirschler; U.S. Pat. No. 3,565,964 issued Feb. 23, 1971 of Ronald D. Bushick and Alfred E. Hirschler, Ser. No. 207,870 filed Dec. 14, 1971 of John A. Hedge; U.S. Pat. No. 3,396,203 issued Aug. 6, 1968 of Ronald D. Bushick; and Ser. No. 333,412 filed Feb. 3, 1973 of Elmer J. Hollstein and Robert B. Roth titled "Catalyst Comprising Acid-Contacted Mordenite and Process of Use" (all of which disclose zeolite catalysts which can be used in the process of the present invention).

BACKGROUND OF THE INVENTION

It has been known that low molecular weight paraffin hydrocarbons (such as n-heptane or n-hexadecane) can be converted to isomeric hydrocarbons by catalytic contacting at a temperature in the range of from 600° to 1,000° F and at a pressure in the range of 100–1,000 psig, in the presence of hydrogen, see U.S. Pat. No. 3,146,279 of Gallagher issued Aug. 25, 1964. Such isomerization (as reported in U.S. Pat. No. 3,146,279) is accompanied by a high degree of conversion to hydrocarbons of lower carbon number. For example, in U.S. Pat. No. 3,146,279 it is reported that, when contacted at 700° F, 500 psig and 2 WHSV in the presence of a CaNa X zeolite which also contained platinum, normal hexadecane was converted to 36.3% $C_{16}$ isomers and 25.2% of $C_{13}$-$C_{15}$ hydrocarbon.

U.S. Pat. No. 3,308,052 issued Mar. 7, 1967 to Ireland et al. deals with cracking and hydroisomerizing waxy hydrocarbons in the presence of at least 100 psi hydrogen and using as a catalyst one or more of platinum, palladium and nickel preferably on a support comprising eta alumina and especially gamma alumina or a nonalkaline base such as bentonite, bauxite, faujasite and the like containing chlorine and/or fluorine. It is well known that faujasite contains a high sodium content as an exchanged cation (typically, the cations in faujasite are sodium, calcium and magnesium).

U.S. Pat. No. 3,400,072 to Tung et al. discloses that the pour point of crude petroleum and straight run fractions can be reduced by contact at 350° to 850° F, pressure atmospheric to about 2000 psig, with certain zeolite catalysts having a silicon to aluminum ratio of 1:1 to 4:1 and "being further characterized by the absence of monovalent cations from some of the available cation sites..." Such "decationized" zeolites can contain polyvalent cations of magnesium, calcium, barium and (in a minor portion) of a Group VIII metal. Tung et al. do not disclose the treatment of "vacuum distillates" or lube oil (or higher) boiling range charge stocks (i.e., stocks boiling mainly above 700° F, typically at least 95 volume percent boiling above 700° F by ASTM method D-86 or a similar method) or charges consisting mainly of waxes. Nor do Tung et al. disclose zeolites with an Al/Si ratio of 0.2 or lower.

SUMMARY OF THE INVENTION

Broadly, our invention is a process for converting waxy hydrocarbons to oils in the lubricating oil boiling range. The process can also be used to increase the yield of lower viscosity distillate fractions in wax-containing or wax-free distillate oils having a viscosity-gravity constant (VGC) in the range of 0.84–0.94. The process comprises contacting the waxy hydrocarbons or 0.84–0.94 VGC feed with a catalyst comprising an acidic crystalline aluminosilicate zeolite at a liquid hourly space velocity based on the fresh feed in the range of 0.1–10.0 (based on the crystalline zeolite content of the catalyst), and hydrogen pressure in the range of 400–6,000 psi, at a gas recycle rate in the range of 0–20,000 scf/bbl of fresh feed and at a temperature in the range of 350° to 675° F, said space velocity, pressure, temperature and recycle conditions being selected so as to attain significant conversion (e.g., at least 6%) of said waxy hydrocarbon and/or 0.84–0.94 VGC feed to oils in the lubricating oil boiling range and with no appreciable conversion (i.e., less than 15% of feed) of said waxy hydrocarbons or feed to materials boiling lower than the lubricating oil boiling range.

In a zeolite catalyst for hydroisomerization of waxy hydrocarbons and/or to increase the yield of lower viscosity fractions in a naphthenic charge (especially with a VGC over 0.84), the content of sodium and other alkali metals should be as low as possible (preferably less than 25% of the exchange capacity of the zeolite, more preferred less than 10%). Generally, on a fully hydrated basis, the zeolite (such as those of application Ser. No. 716,190) will contain less than 2 weight percent (more preferred less than 1%), typically less than 0.75%) alkali metals and on an ignited basis less than about 3% (more preferred less than about 1.5%). Furthermore, the preferred catalysts in the present process have "protonic sites," that is, the exchanged cations include H+ (or protons). Such catalysts are described, for example, in Ser. Nos. 716,190; 185,615; 207,870; 211,040 and 333,412. In the preferred zeolites in the present process at least 10% of the exchange capacity of the zeolite is satisfied by cations of polyvalent metals (especially of the rare earth metals such as lanthanum, cerium, gadolinium, dysprosium, etc.) which contain less than 1.5% alkali metal cations, on an 1,800° F ignited basis and in which the remainder of the exchange capacity is satisfied by protons. More preferred, the catalyst will also contain a hydrogenation-dehydrogenation component, such as a Group VIB, VIIB, VIII metal (or oxide, hydride or sulfide thereof). Multicomponent hydrogenation-dehydrogenation, catalysts are especially useful (e.g., NiMo, NiW, NiCo, NiCoMo).

The present invention deals with the discovery that, when contacted with an acidic crystalline aluminosilicate zeolite catalyst at hydrogen pressures above 400 psi and temperatures below 675° F and preferably below 650° F (more preferably from 500° to 575° F), waxy hydrocarbons, such as "paraffin wax" or petroleum streams containing waxy hydrocarbons, can be converted to oily materials without appreciable hydrocracking to materials boiling below the lubricating oil boiling range (i.e., less than 10 volume percent of the charge is converted to material boiling below 600° F). In the preferred catalyst at least 25% of the exchange capacity of the zeolite is satisfied by cations of polyvalent metals and less than 25% (more preferred less than 10%) of the exchange capacity is satisfied by exchanged cations of alkali metals or amino compounds (e.g., ammonium cations). We further prefer that the catalyst be virtually free of halide ions (e.g., less than 0.1 weight percent on an ignited bases). The catalyst can, however, contain minor amounts of sulfur or nitrogen obtained by contacting the zeolite (especially a zeolite of mordenite cage structure; see Ser. No. 333,412 of Hollstein and Roth) with a solution containing sulfate or nitrate anions or both.

Also preferred is a zeolite which is at least 15% crystalline by X-ray, is capable of adsorbing benzene and having an Al/Si ratio in the range of 0.05–1.0 (with faujasites, more preferred 0.8–0.3, e.g., types X and Y). In view of such prior art teachings as U.S. Pat. No. 3,146,279, it is surprising that in the present process, at a temperature in the range of 500° to 575° F (typically in the range of 520° to 560° F), there can be appreciable isomerization of wax to oil with virtually no conversion of wax to hydrocarbons of lower carbon number. As used herein, the word "wax" refers to a saturated hydrocarbon or a mixture of saturated hydrocarbons having refractive indexes at 212° F in the range of 1.41–1.45 and which melts at 80° F or higher (generally below 210° F). By "oil" is meant a hydrocarbon or mixture of hydrocarbons which is fluid at 50° F and has a viscosity at 100° F in the range of 35 SUS to 12,000 SUS.

Waxy hydrocarbons, per se or in a petroleum fraction in the lubricating oil boiling range, can be converted to oily, non-waxy hydrocarbons by contacting said wax or wax-containing stream with an acidic alumino-silicate zeolite catalyst (e.g., HX, HY, HL, LaHX, CeHY, CaHX, MgHY, BaHY, SrHL, NiHY, GdY, GdHX, etc.) preferably in combination with at least one hydrogen active metal (e.g., nickel, cobalt, molybdenum, tungsten, platinum, palladium, rhenium, ruthenium, etc.) or a hydrogen active compound of such a metal, such as a sulfide, oxide, hydride and mixtures of two or more metals and/or such compounds (e.g., NiMo, NiW, NiCoMo, CoMo, CoW, NiCo), at temperatures above 300° F and at elevated hydrogen pressure. Preferably, the concentration of each such hydrogen active metal is from 0.05–25% based on the weight of the zeolite. Preferably, the zeolite is substantially anhydrous (containing about 0.1–10% $H_2O$ as determined by ignition analysis at 1,800° F).

Preferably, the isomerization is conducted at a temperature below the point where substantial hydrocracking will occur (e.g., below about 675° F, more preferably below 650° F). Preferably, the average hydrogen pressure in the catalytic contact zone is in the range of 400–6,000 psi (more preferably, at least 1,500 psi of hydrogen).

Among the preferred alumino-silicate zeolite catalysts (and catalyst combinations comprising an acidic alumino-silicate and a hydrogenation metal) are those described in U.S. Pat. No. 3,396,203 of Ronald D. Bushick issued Aug. 6, 1968 and in the above referred to copending applications of Hollstein and Roth, Hirschler, Bushick and Hirschler and of Kirsch, Barmby and Potts. Preferably, the alumino-silicate framework of the zeolite is at least 15% crystalline by X-ray analysis. The zeolite is chemically characterized by the empirical formula $M(AlO_2)_x(SiO_2)_y(H_2O)_z$ where $x$, $y$ and $z$ are integers, the ratio $x/y$ being in the range of 1.0–0.01 (preferably 0.08–0.8) and where M signifies the cations necessary for electronic equivalency and comprises one or more of the following: H+, a cation of a polyvalent metal, a metal oxide, a metal hydroxide, a metal hydride, or a metal cation containing two or more members selected from the group consisting of oxide, hydroxide and hydride. Preferably at least one such polyvalent metal cation is present for every 20 atoms of aluminum in the alumino-silicate framework of said zeolite. For most waxy hydrocarbons and wax-containing petroleum fractions boiling in the lube oil range, the ratio $x/z$ in the empirical formula of a zeolite is more preferably in the range of 0.1–4, especially in zeolites having the faujasite cage structure.

FURTHER DESCRIPTION OF THE INVENTION

Waxy lube streams or waxes can be isomerized by contacting with an acidic alumino-silicate catalyst in the presence of hydrogen and at a temperature below 675° F, and preferably below 650° F (more preferably in the range of 500° to 575° F). Preferably, the conditions are such that the feed is in liquid or mixed phase. Such an isomerization process can be used to produce a lubricating oil directly from a waxy lube stream, without the conventional dewaxing procedure, or alternatively, the process can be used in conjunction with conventional dewaxing to increase the yield of lubes. For example, a waxy petroleum distillate in the lubricating oil viscosity range (i.e., 35–10,000 SUS at 100° F) and which contains up to 20 weight percent wax can be contacted with a "decationized" or "protonated" molecular sieve zeolite (e.g. HY, HX) which also contains a small amount of palladium (e.g., 0.1–2%) at 550°F and at a hydrogen pressure in the range of 400–6,000 psi for sufficient time to cause appreciable lowering of the pour point of the feed. Preferably, with such distillate oil feeds, the liquid hourly space velocity is in the range of 2–10 volumes of fresh feed per volume of catalyst (based on the content of crystalline zeolite) per hour. The resulting isomerized oil stream (which can, if desired, contain some unisomerized wax) can be processed by conventional procedures, such as solvent extraction (as with furfural or phenol), conventional dewaxing (as by pressing or by crystallization as from a solvent like methyl ethyl ketone and toluene), acid contact (e.g., HF, $BF_3$, $H_2SO_4$, $SO_3$), clay contacting, catalytic aromatization or hydrogenation, etc.

The process can also be used to increase the yield of lower viscosity fractions in a low pour point lube and/or in a wax-free, high VGC lube.

The preferred conditions include temperatures above 300°F and elevated hydrogen pressure (e.g., 400–6,000 psi, more preferred at least 1,500 psi of hydrogen), the most preferred hydrogen purity being 50–100%). Preferably, the zeolite contains polyvalent metal cations, is virtually free from alkali metal cations and halide ions and can contain in the range of 0.0–18% $H_2O$ (preferably 1–10%, typically 1.5–5%) as determined by ignition analysis at 1,800° F. A preferred feed stock is a waxy "heavy gas oil" of the type used as a charge to a lube oil hydrocracking process (e.g., see U.S. Pat. No.

3,663,427 issued May 16, 1972 to Thomas and the said Steinmetz); however, "wax-free" or low pour point (i.e., 0° F or less) straight run distillate or raffinate oils can also be converted by this process to improve yields of lower viscosity lubes.

Such wax-free or low pour point lubes are described, for example, in U.S. Pat. No. 3,502,567 issued Mar. 24, 1970 of Mills and Dimeler and U.S. Pat. No. 3,184,396 issued Mar. 18, 1965 of Armstrong. They can have been "dewaxed" and preferably have a VGC in the range of 0.83–0.94, more preferred 0.84–0.92 (typically 0.850–0.899) and have an SUS viscosity at 100° F in the range of 40–12,000, more preferred 200–8,000. The preferred wax-free distillate charge includes "naphthenic distillate oils" of the types described in Ser. No. 298,126 filed Oct. 16, 1972 of Bryer, Newingham, Mills and Dimeler, the disclosure of which is incorporated herein. These oils are considered "wax-free" and have pour points in the range of −45° to +20° F, depending upon their viscosity.

The conversion of such wax-free, high VGC lubes can be at about the same conditions as are useful in converting waxes to oils (e.g., at 560° F and 1,500 psi of hydrogen) by contact with an acidic zeolite catalyst to obtain an isomerized product having a lower viscosity and altered Engler boiling range and in which a significant proportion (typically at least 10 weight percent) of the charge has been converted to lower viscosity oils.

In general, this conversion of high viscosity "naphthenic" oils to lower viscosity oils of about the same VGC implies the conversion of naphthenes to isomers, for example, normal alkyl constituents to branched alkyl substituents and/or one condensed ring structure to a different condensed ring structure.

Lower molecular weight hydrocarbons (e.g., boiling in the gasoline or gas oil ranges) can also be products of the reaction, due to mild hydrocracking. However, it is an especially advantageous feature of the present process that it an be conducted under conditions such that no substantial hydrocracking occurs (so as to not produce appreciable material boiling below the lubricating oil range). Generally, the temperature, space velocity, hydrogen pressure and gas recycle are so chosen that no more than 10% (preferably less than 5%) by volume of the feed stock is converted, in a single pass through the reactor, to products boiling below the lubricating oil boiling range and, when the catalytic contacting is at a temperature in the range of 500° to 575° F (more preferably 520° to 560° F), the present process can be used to effect the conversion of waxes to oils with essentially no conversion of waxes to products of lower carbon number.

In our process, as in conventional hydrodesulfurization or hydrorefining, some lower boiling products (e.g., $H_2S$, $NH_3$, dry gas, etc.) can be formed by hydrogenation of non-hydrocarbon impurities in the feed stocks. Any such gases or other lower boiling, low viscosity liquid products (e.g., liquids having viscosities at 100° F of less than 35 SUS, such as gas oil or gasoline) can be removed by stripping or distillation. For example, it is generally preferred that any entrained or dissolved $H_2S$ be removed from the oils produced by the present process. It is sometimes beneficial to pretreat the feed stocks (as by conventional hydrodesulfurization) prior to contact with the zeolite catalyst. When the zeolite catalyst contains or is in combination with a hydrogenation catalyst which can be poisoned by nitrogen or sulfur, such as platinum, it is frequently economical to pretreat the feed stock (as by contact with sulfided NiMo or NiCoMo catalyst at 450° to 675° F, 300–1,500 psi of hydrogen) to reduce the sulfur and nitrogen in the feed to less than about 500 ppm and more preferably to less than 50 ppm (typically less than 10 ppm). However, with the mordenite catalysts of the Hirschler and the Hollstein-Roth applications, the feed can contain appreciable amounts of sulfur compounds.

In general, the present process consists of contacting the feed stock (e.g., the waxy hydrocarbon, or the lube stream containing the waxy hydrocarbon) with an acidic alumino-silicate zeolite catalyst at a temperature above 300° F and at elevated hydrogen pressure. Preferably, in order to maximize the conversion of wax to oils while minimizing or effectively eliminating hydrocracking, the temperature should be below 600° F (preferably below 575° F), the conversion of wax to oil per pass through the reactor should be no more than about 60%, and the hydrogen pressure should be at least 400 psi (preferably at least 1,500 psig and more preferably at least 5,000 psi of hydrogen). The hydrogen can be from 50% to 100% purity (preferably at least 70%) and the hydrogen recycle can be in the range of 0–20,000 scf/bbl of oil. For example, at 400 psi of hydrogen the recycle is preferably in the range of 1–4,000 scf/bbl of oil, at 1,500 psi the preferred range is 2,000–12,000. Liquid feed can be recycled at a product-to-fresh feed weight ratio below 15:1 (preferably 8:1 to 1:1). The liquid hourly space velocity of the fresh feed is preferably in the range of 0.1–10 and, more preferably, from 0.25–3.0 (based on the crystalline zeolite content of the catalyst if the zeolite is imbedded in a non-reactive carrier such as silica or alumina or, in a significantly less reactive carrier, such as an amorphous acidic aluminosilicate). When the feed is an oil, such as a distillate oil or an extract or a raffinate of a distillate oil and contains no more than about 50 weight percent wax, the liquid hourly space velocity of the fresh feed is preferably greater than 2 (based on the crystalline zeolite content of the catalyst) at contact temperatures in the range of 550° to 650° F and is in the range of 0.5–2.0 when the contact temperature is in the range of 450° to 550° F, for a distillate oil containing no more than 20 weight percent wax (typically 9–18%).

In general, the feeds to the present process can be of the following five general types:

a. Wax (which can contain up to 10% by weight of oil), b. highly oily waxes (containing from 10–50% oil), c. highly waxy oils (containing from 20–50 weight percent wax) and d. oil containing minor amounts (up to 20 weight percent) of wax. This group includes "dewaxed" oils having a pour point in the range of about −20° to 0° F and a viscosity-gravity constant below about 0.85, since such oils contain sufficient wax that the present process can provide a useful conversion thereof; however, the typical feed to the process will have a pour point greater than 0° F.

e. "Naphthenic" and "aromatic" oils which are generally considered wax-free. That is, oils which have not been "dewaxed" and which have a low pour point for a given viscosity at 100° F (e.g., 200 SUS at 100° F and pour point of −25° F). Usually these oils have a viscosity-gravity constant in the range of 0.84–0.92, typically 0.85–0.90.

Examples of these five classes, respectively, are as follows:

A. A paraffin distillate wax containing 1.4% of oil (ASTM D 721-56T), melting (ASTM D 87-57) at about 142° F, and having a viscosity at 210° F (ASTM D 446-53) of 40.4 SUS and which is obtained from a mixed base crude.

B. 650° to 1,000° F boiling range distillate (50 SUS at 210° F) or deasphalted bottoms (or residua) from vacuum distillation of Rio Zulia crude, having a viscosity at 210° F of 170 SUS and containing 60% wax. "Slack" waxes are also usually in this group.

C. A straight distillate (650° to 1,070° F) of Lagomedio crude having a viscosity at 210° F of 49 and containing 25 weight percent wax.

D. A raffinate oil, containing 14 weight percent wax and boiling mainly in the range of 625° to 900° F, obtained by furfural extraction (raffinate yield of 70%) of a paraffinic distillate of heavy B crudes.

E. Straight run naphthenic distillate (through caustic, see U.S. Pat. No. 3,080,312 to Honeycutt issued Mar. 5, 1963) from Grade A Gulf Coastal Crude which is substantially free from naphthenic acids (ASTM said number below 1.5 mg KOH per gram, typically 0.1–0.5), has a pour point of +10° F, a VGC of 0.88 and an SUS viscosity at 100° F of 2,500, see Ser. No. 240,806.

Other examples of suitable charge stocks which contain varied proportions of wax and oil are those listed in U.S. Pat. No. 3,308,052 of Henry R. Ireland and Michael T. Smilski issued Mar. 7, 1967.

Other examples of "wax-free" naphthenic oils are the distillate and hydrorefined lubes found in Ser. No. 240,806 filed Apr. 4, 1972 of Coppock, Amaroso and Griffith (now U.S. Pat. No. 3,813,338), which is incorporated herein.

Process conditions which maximize yield of oil and minimize the production of lower boiling products can vary greatly from class to class even though the type of wax and type of oil are similar. In general, where the wax content is high (50–100%), the primary considerations are to utilize a temperature in the range of 450° to 600° F (more preferably no greater than 550° F) and a sufficiently low space velocity to provide for a reasonable degree of conversion of wax to oil. In any event, the conditions should be so selected that less than 15% of the charge is converted, per pass, to products boiling below 650° F. In contrast, where the wax content is less than 50 weight percent, temperatures above 550° F to as high as 675° F can be utilized (but preferably, the temperature with such feeds is no greater than 650° F); however, to minimize or effectively eliminate hydrocracking to material boiling below the lube range, a high liquid hourly space velocity (2 or more) is beneficial. Where the wax content is less than about 20% and the contact temperature is no greater than 550° F, a liquid hourly space velocity in the range of 0.5–5 is beneficial.

Preferably, in a commercial fixed-bed reactor, the catalyst bed comprises at least 10%, and can contain up to 100%, of acidic crystalline alumino-silicate zeolite catalyst, the remainder being comprised of amorphous alumino-silicate, alumina, silica, acidic clays, bauxite, and a hydrogenation catalyst. In a stirred slurry reactor, it is preferred that the catalyst be as close to 100% crystalline as economics will permit since, in general, the catalyst with the higher degree of crystallinity will have the greater activity and therefore can be used at lower catalyst to feed ratios (and thus will require less power (or agitation) to remain in suspension).

The catalyst can be any of the acidic crystalline alumino-silicate zeolites disclosed in the aforementioned applications and patents. Among the preferred catalysts is an acidic alumino-silicate zeolite which can adsorb benzene, is at least 15% crystalline by X-ray, contains polyvalent metal cations, and which also has associated therewith a platinum group dehydrogenation catalyst (which, as with the other hydrogenation catalysts, can be incorporated with the zeolite by exchange and/or impregnation and/or physical blending). Other operative catalysts include an acidic zeolite catalysts and a dual function (hydrogenation and isomerizing) catalyst like CoMo, NiW, NiCoMo, CoW, etc., or a promoted catalyst as, for example, by addition of a fluoride or a chloride to a hydrogenation catalyst such as platinum, palladium, nickel, etc., (however, the catalyst can be halide-free). With such multi-component catalysts as NiMo, NiW, etc., one metal (e.g., Ni) can be incorporated by ion exchange and another by impregnation (e.g., ammonium molybdate or tungstate).

Preferably, prior to contacting the feed with the catalyst, the alumino-silicate zeolite is activated (as, for example, by the procedures described in the Kirsch, Barmby, Potts application, Ser. No. 716,190 and in South African Pat. No. 4803/67 which issued May 29, 1968) until it is substantially anhydrous (including from known to the art as "dehydroxylated" and "ultrastable", see J. Catalysis 13, 114–116 (1969)) and, when a hydrogenation catalyst is also present (such as palladium), the catalyst combination is preferably reduced with hydrogen prior to introduction of the feed (such as by passing hydrogen at atmospheric pressure and at 1,000° F over the catalyst for about 2 hours). Among the commercially available catalysts which can be used in the present process (either per se or in combination, as by admixture, with other catalysts) are those marketed under the trade names Linde SK-100, SK-100, SK-200, SK-300, SK-400, SK-410 and SK-500.

When the charge stock to the present process is a wax-containing, petroleum fraction in the lubricating oil range (having a viscosity in the range of 35 SUS to 10,000 SUS at 100° F), the conversion of waxes in the feed to hydrocarbon products of lower carbon number, during the isomerization, can be virtually undetectable (by vapor phase chromatographic analysis) when the contact temperature is no greater than 575° F. At temperatures below 600° F, with the proper choice of conditions (especially pressure and space velocity), the production of lower carbon number hydrocarbon products can be kept below 5% by weight, based on the fresh feed.

With commerically available zeolite catalysts, the conversion per pass under these conditions will be less than 60 volume percent (typically from 10–30%) based on the volume of fresh feed; however, higher degrees of conversion with substantially no hydrocracking to gaseous products can be obtained with crystalline alumino-silicate zeolite catalysts which contain less than one alkali metal cation and at least one cationic monovalent, divalent or trivalent rare earth metal (e.g., dysprosium$^{+3}$), metal oxide (e.g., $^+$DyO or $+^2GdOGd^{+2}$) metal hydride (e.g., $HGd^{+2}$) metal hydroxide (e.g., $^{+2}CeOH$) or mixed metal hydride hydroxide (e.g., $H-La^+-OH$) for every 12 atoms of aluminum in said alumino-silicate framework. Preferably, the content of alkali metal cations is as low as economics will permit, typically less than 0.5 weight percent (more preferably less than 0.1 weight percent) of alkali metal. The catalyst can also be promoted with a compound of fluorine or chlorine (e.g., such as HF, $BF_3$, $CCl_4$, $BCl_3$, $AlCl_3$, $CH_3Cl$, chlorinated paraffins, etc.). Minor amounts of water (e.g., steam) can also have a promoting effect, as by addition to the reactor with the fresh feed or by exposing the activated catalyst to moist air or steam (at temperatures up to about 450° C) prior to incorporation in the reactor.

When the hydrogenation catalyst is a sulfactive metal such as tungsten, nickel, molybdenum, cobalt or a combination of two or more such catalysts (NiCoMo or NiW, etc.) it is sometimes advantageous to precondition the catalyst by sulfiding, as by exposure to $CS_2$ or to $H_2S$). The petroleum distillate which contains waxy hydrocarbons can also be extracted with an aromatic selective solvent (e.g., furfural, phenol, etc.) prior to contact with the catalyst in order to reduce the aromatic content of the feed and provide for a greater degree of conversion of waxy materials to desired products.

In contrast with the prior art disclosures that the zeolite-catalyzed hydroisomerization of n-paraffins is accompanied by a concomitant decrease in the carbon number of a considerable proportion of the feed paraffin (and evan a significant production of gaseous hydrocarbons); in the process of the present invention it has been discovered that at a temperature of about 575° F, or lower (typically 520° to 560° F), waxy hydrocarbons can be isomerized to oils without any appreciable conversion of the waxy hydrocarbon to materials of lower carbon number. Except for a small production of methane, ethane, propane, butanes, pentanes and/or such gases as $H_2S$, $NH_3$, $H_2O$ or HCl which are produced by hydrodesulfurization of heterocyclic oxygen, sulfur and nitrogen compounds or other non-hydrocarbons which can be present as impurities in lubricating oil distillates, the present process can be used to isomerize waxy hydrocarbons in a hydrocarbon feed in the lubricating oil viscosity range while producing virtually no lower carbon number materials.

For example, where the waxy hydrocarbons are contained in an oily feed stock (such as distillate, extract or raffinate) which contains less than 50 weight percent of wax, the present process is capable of effecting significant conversion of the waxy hydrocarbons to oil with a surprisingly small concomitant conversion of the feed to hydrocarbons boiling in the $C_1-C_5$ range (e.g., less than 75 scf of such gases—typically less than 35 scf and even less than 15 scf—are produced, in a single pass through the reactor, for each barrel of fresh feed stock).

In general, a $C_1-C_5$ gas production in the range of 10–30 scf/bbl of feed per pass is typical in the hydrotreating or hydrorefining of lube oil boiling range feeds as distinguished from hydrocracking where 100 and more scf/bbl is typical. In lube oil distillate, an average molecular weight is about 400–600. Therefore, if 100% of such a lube oil charge were converted to $C_1-C_5$ gases about 5,000 scf of gases would be produced per barrel of feed. Therefore, it can be seen that such gas production in the present process can be limited to no more than about 2% (typically less than 1 weight percent) of the feed (per pass through the reactor). Chromatographic analysis of a waxy hydrocarbon feed material (such as a paraffinic raffinate produced by furfural extraction of a lubricating oil distillate fraction obtained from crude oil having a viscosity-gravity constant within the paraffinic crude range) before and after catalytic contact in the present process will indicate no significant conversion to lower carbon number products (e.g., less than 10% by volume based on the weight of feed converted, and typically less than 1%) in a preferred embodiment.

In general, the waxy hydrocarbons which can be converted to oils by the present process contain at least 20 carbon atoms. Hydrocarbon feeds obtained from petroleum distillates, and which are useful in the present process, can contain waxy hydrocarbons having as many as 60 carbon atoms (more preferably, the waxy hydrocarbons to be converted contain in the range of 22–44 carbon atoms).

A particularly useful feed stock for the present hydroisomerization process is a distillate fraction in the lubricating oil boiling range, obtained by distillation of Lagomedio, Louisiana Heavy B, Rio Zulia or similar waxy crudes. Such distillate products, or the extract or raffinate from extraction of such a distillate with an aromatic selective solvent, will frequently leave a waxy film on the sides of a container (such as a glass bottle) containing a sample thereof. The present hydroisomerization process can be used to reduce or eliminate this waxy deposit from such distillate, extracts or raffinates.

Among the uses which can be made of the process of the present invention are the following:

1. Converting waxes (including "slack waxes") to lower boiling hydrocarbons of substantially the same carbon number as the wax;
2. Converting waxy lube streams, either entirely or in part, to low pour point lubes;
3. Isomerizing naphthenic lubes to lower the viscosity pour, increase the viscosity index and improve such other properties as ultraviolet stability, oxidation stability, thermal stability and such electrical properties as dissipation (in the case of cable oils) and the impulse-breakdown voltage (for transformer oils); and
4. When conducted under conditions such that substantially all of the aromatic hydrocarbons present in the oil are saturated (or when the isomerized product is subjected to an additional hydrogenation step to saturate residual aromatics) the resulting product can be useful as a lubricant in a traction drive transmission (or as a component of such a lubricant). For use in a traction drive transmission, as a lubricant, the product oil should contain less than 1% of aromatic hydrocarbons, and preferably less than 0.1%.

The process can also be useful for upgrading aromatic extracts, such as rubber oils, particularly when the isomerized product is subjected to an additional processing step in which aromatization of naphthenic hydrocarbons to aromatic compounds occurs (see U.S. Pat. No. 3,681,279 issued Aug. 1, 1972 of Ivor W. Mills, Glenn R. Dimeler, Merritt C. Kirk, Jr., the disclosure of which is incorporated herein).

ILLUSTRATIVE EXAMPLES

In the following illustrative examples, Examples 1–8 illustrate the results which can be obtained in a rocking autoclave when waxes (or lubricating oil distillates containing waxy materials) are contacted with an acidic alumino-silicate zeolite catalystt (in the examples, protonated type Y zeolite (HY) containing about 0.5% palladium) at temperatures in the range of about 300° to about 750° F at hydrogen pressures in the range of about 400–6,000 psi (with hydrogen of from 50–100% purity). Examples I and IV show that at temperatures above 600° F considerable hydrocracking can occur. Examples II and III illustrate that little or no isomerization to oily products occurs at temperatures in the range of about 300° to 350° F with the HY (palladium) catalysts. Examples V and VI show that significant conversion of wax to oil can occur at temperatures in the range of 500° to 550° F with no appreciable hydrocracking of the feed wax. Examples VII and VIII illustrate the results that can be obtained from the present process when a hydrocarbon charge in the lubricating oil boiling range and containing waxy hydrocarbons is contacted with an acidic zeolite catalyst at temperatures in the range of 550° to 650° F and hydrogen pressures in the range of 1,500 psi (and higher) at relatively low catalyst-feed ratios.

Examples IX and X illustrate the practice of the present process in a continuous manner wherein, in Example IX, the charge stock is a raffinate oil obtained by furfural extraction of a paraffinic distillate in the lubricating oil boiling range and, in Example X, when the aromatic extract product from the furfural extraction is the charge stock to the continuous isomerization process.

EXAMPLE I

A rocking autoclave having a volume of 300 cc was charged with 62.8 grams of a paraffin wax which is available commercially under the trade designation Sunoco 3425 and which has the physical properties shown in Table 1 of U.S. Pat. No. 3,764,516. Also charged with the wax was 10.4 grams of HY (palladium) zeolilte catalyst (available commercially as Linde SK-100), which had been pulverized so that 100% of the catalyst would pass through a 100 mesh screen. Table 2 presents an analysis of the HY (palladium) zeolite. Prior to introduction of the catalyst to the bomb, the commercially available catalyst was activated in a pyrex tube as follows:

The catalyst was heated to 300° F in a stream of flowing nitrogen. Then the nitrogen stream was replaced by a stream of flowing hydrogen (20 scf $H_2$ per pound of catalyst) and the temperature slowly increased to 380° F, at which temperature there was a sudden drop in temperature and a considerable quantity of water was observed at the outlet of the tube. The hydrogen flow and heating was continued until the temperature in the tube was 1,000° F. While the catalyst temperature rose from 380 to the final temperature of 1,000° F, there were a number of times when the temperature dropped and water formed at the outlet of the tube. The catalyst was maintained at 1,000° F in the presence of flowing hydrogen for 2 hours and then allowed to cool under a nitrogen purge. The cooled catalyst was then charged to the autoclave.

The autoclave was pressurized at ambient temperature (34° C) to 1,500 psi with hydrogen and then heated to 730° F over a period of about 4 hours. No hydrogen was consumed until the temperature reached 180° F. The bomb was continually repressurized to about 5,000 psig with hydrogen over that period. The time at a temperature over 600° F was less than 1 hour, with the average temperature during the run being about 500° F. The peak temperature was about 730° F, for 10 minutes, at a pressure (at that temperature) of about 5,000 psig. After reaching 730° F, the bomb was allowed to cool to room temperature at which time the pressure was 1,600 psi.

Table I herein summarizes the conditions of this example and describes the product obtained, which was a liquid which contained oil boiling in the lubricating oil boiling range. Vapor phase chromatographic analysis indicated about 50% of the wax charge was hydrocracked to hydrocarbons lighter than gas oil. The waxy lube yield was about 50% of the charge and the wax-free lube yield was about 33% of the charge.

EXAMPLE II

Example I was repeated except that the conditions were those summarized in Table I under the heading "Run 2" and included a peak temperature of 315° F. Table II describes the results of this run, which did not produce any appreciable amount of oil from the wax charge. However, the aromaticity by ultraviolet analysis (UV aromaticity) was reduced from 0.6 in the charge to 0.00 in the product of Run 2. This indicates that wax feeds can be hydrogenated with a platinum group metal catalyst at temperatures around 315° F (e.g., 300° to 350° F) and hydrogen pressures in the range of 300–5,000 psig to completely eliminate UV aromaticity in the wax while producing no isomerization or cracking of the wax. Such hydrogenation also improves the color of the wax (especially of residual waxes which have not been clay contacted). For those uses which require that the wax meet specifications of the United States Food and Drug Administration, it can be highly desirable to so reduce the UV aromaticity of the wax. When the feed to the present process is a wax, a reduction of UV aromaticity is one advantage of the present invention. When this run is repeated at longer contact times with a GdHY (platinum) catalyst and at appreciably higher catalyst to feed ratios (from 0.5–2 parts by weight of catalyst per part by weight of wax), some wax can be converted to oil with no appreciable hydrocracking.

EXAMPLE III

Example I was repeated except that the conditions are those summarized in Table I under the heading "Run 3" and included a peak temperature of 450° F and 12 hours of catalyst/feed contact at the peak temperature. The product had an oily appearance, indicating that some isomerization of wax to oil had occurred. A higher catalyst/feed ratio (e.g., in the range of 0.5 to 2 grams of catalyst per gram of hydrocarbon) can be used to increase the degree of conversion of wax to oil.

The degree of conversion of wax to oil at 450° F can also be increased by utilizing catalysts prepared by rare earth exchange of an ammonium-exchanged zeolite (which is as from alkali metal ions as economics will permit), followed by activation to remove substantially all of the ammonia and water in the zeolite. Similarly, such a catalyst when compounded with about 0.5% of a noble metal catalyst and activated with hydrogen, under the procedure of Example I, can appreciably increase the degree of conversion of wax to oil, particularly at temperatures in the range of 500° to 550° F.

EXAMPLE IV

Example III was repeated except that the conditions were those shown in Table I as "Run 4" and included a temperature of 600° F and a lower catalyst/feed ratio. A liquid product was obtained from this run which did not appear to contain any compounds of about the same carbon number as the compounds in the wax charge, but appeared (by gas chromatographic analysis) to be completely hydrocracked to hydrocarbons containing 20 or less carbon atoms. The product also had a surprisingly low pour point, indicating that temperatures around 600° F (e.g., 575° to 650° F) and long contact time (or low space velocity) with a combination catalyst comprising an acidic zeolite catalyst and a hydrogenation catalyst, can be useful in producing low pour point fuels (and/or light lubes, white oils or textile oils) from waxes or wax-containing petroleum feeds.

At 600° F, with HY (palladium) or a catalyst of this activity level (or greater) very low contact times (less than 2 hours under the conditions of Run 3) or high liquid hourly space velocity (2–10), for continuous processing, are required if the production of oil is to be maximized and hydrocracking to products boiling below 600° F is to be effectively eliminated. More preferred is to maintain the contact temperature at no greater than 560° F.

EXAMPLE V

Example I was repeated except that the conditions were those shown in Table I as "Run 5" and included a larger bomb (1,000 cc) and a temperature of 500° F. As is summarized in Table II, a solid product was obtained, which had an oily appearance and which, upon analysis, indicated a yield of at least 5.8% of oil. The product also had a solidification point of 45° F which was a considerable reduction from the initial 125° F solidification point of the wax. The yields indicated in Table II are minimum yields, since after extraction of the oil the wax appeared to contain appreciable quantities of unextracted oil. Appreciable increases in the yield of oil can be obtained by utilizing a more active zeolite catalyst, or higher catalyst/feed ratios (or, in a continuous process, a lower LHSU, such as 0.1–0.5).

EXAMPLE VI

Example V was repeated except that the conditions were those shown in Table I as "Run 6," and within experimental error, involved only a change in the peak reaction temperature. That is, the temperature in "Run 6" was 550° F instead of the 500° F of "Run 5." A minimum yield of 16% of oil was extracted (at −12° F) from the product of "Run 6," which was a solid with an oily appearance and having a solidification point of 35° F. No detectable conversion of wax to lower carbon number compounds was observed by vapor phase chromatographic analysis of the product of "Run 6."

At 550° F and hydrogen pressures above 1,500 psig (preferably above 3,000 psig), a significant increase in the yield of oily product, over that observed in this example, can be obtained by utilizing higher catalyst/feed ratios (e.g., 0.1–1.0), a more active catalyst, such as CeHY (palladium), or in a continuous process, a liquid hourly space velocity in the range of 0.1–2.0. A recycle of unreacted product can be used at temperatures in the range of 520° to 560° F and pressures above 1,500 psi of hydrogen to substantially completely convert wax or waxy hydrocarbons to oils in the lubricating oil boiling range with no significant production of gaseous hydrocarbons (other than those which can be attributed to removal of heterocyclic, sulfur, nitrogen and oxygen compounds and other non-hydrocarbon impurities present in the feed materials).

EXAMPLE VII

Example VI was repeated except that the conditions were those shown in column 7 of Table II, and included substituting a raffinate oil, in the lubricating oil boiling range, for the wax of Example VI. Vapor phase chromatographic analysis of the product indicated appreciable conversion of waxy hydrocarbons present in the raffinate oil to materials in the lubricating oil boiling range and some conversion of the feed materials to hydrocarbons of lower molecular weight. At 550° F conversion of wax to lower molecular weight hydrocarbons can be effectively eliminated by reducing the catalyst/feed contact time (or in continuous runs, using a liquid hourly space velocity of about 2).

EXAMPLE VIII

Example VII was repeated except that the conditions were those summarized in column 8 of Table I and included a temperature of 650° F. A liquid product was obtained, which contained oil of about the same carbon number as the compounds in the molecular weight range of the original charge and no significant amount of wax, but which also contained an appreciable quantity of hydrocracked product lighter than gas oil (as indicated by chromatographic analysis). The liquid product of this example contained no significant amount of wax and had a specific gravity which was about 18% less than that of the feed. Such a large decrease in specific gravity of a lube boiling range petroleum distillate indicates that the type of conversion in the present example can be of great economic value, to a refiner, since it can give him a great increase in volume yield. Conditions which favor such high volume yield conversions, from waxy distillates containing up to 50% wax, are a temperature in the range of 630° to 680° F, a hydrogen pressure of 750 psi to 7,500 psi, a catalyst combination of an acidic zeolite of the faujasite class and a hydrogenation catalyst, and a long contact time (or low space velocity, e.g., less than 0.5).

EXAMPLE IX

A raffinate oil charge stock, having the same properties as the charge used in Examples VII and VIII, was contacted in a continuous, pilot plant scale, fixed bed reactor containing a bed of pelleted (3/16 inch × 3/16 inch) SK-100 catalyst (which was activated with hydrogen, in the reactor, in a similar manner to that shown in Example I). The "gas" flow through a low pressure stripper or separator, at about 100° F and 15 psig (separated in Table 4 under the heading "LP Gas Yield"), was observed at various operating conditions (as summarized in Table IV herein as Runs 421–426). The LP gas yield is an indicator of the degree of hydrocracking. Typically, in this particular pilot plant operation such low pressure gas analyzed at least 50% hydrogen (Run 426 analyzed 54.4% $H_2$) with the remainder being $C_1$–$C_5$ hydrocarbons and a small proportion (less than 2%) being $H_2S$. Therefore, the "LP Gas Yield," as observed in these runs, indicated the maximum degree of conversion of the feed to $C_1$–$C_5$ hydrocarbons and thus indicated whether, at a particular set of process conditions, there was any appreciable conversion of the feed to materials boiling in the $C_1$–$C_5$ range. In general, an LP gas yield of less than 100 scf/bbl of feed indicates the absence of appreciable hydrocracking. Therefore, it can be seen from the summary in Table II that no appreciable hydrocracking occurred in Runs 422–425. Vapor phase chromatography of the product of Run 421 indicated that the feed had been heavily hydrocracked to hydrocarbons below the lube oil boiling range. In contrast, vapor phase chromatography of the product of a run similar to Run 421, but at an LHSV of 2 and a gas recycle of 2,500 scf/bbl, indicated that, although some hydrocracking occurred, the product was primarily in the lube oil boiling range. Vapor phase chromatographic analysis of the products of Runs 422 and 423 (both at 550° F) showed that no appreciable hydrocracking had occurred (to products boiling below the lube oil range) and that there had been a significant conversion of wax to oil.

EXAMPLE X

The present process is also useful for upgrading extracts from paraffinic distillates. The process can be used to isomerize residual quantities of wax (from 0.5–5%) which can be objectionable in such distillates for some uses, such as for a vinyl plasticizer. Although, for other uses such small quantities of wax are desirable, such as in rubber compositions which are to be extruded, since the wax helps increase the extrusion rate. The present hydroisomerization process is also useful in upgrading such extracts by increasing the viscosity-gravity constant of the extract, probably by conversion of low viscosity compounds to compounds of higher viscosity. Runs 427–433 of Table I herein summarize the conditions used in a continuous isomerization, on a pilot plant scale, of a 30% extract (by furfural) of a paraffinic distillate obtained from Texas and Louisiana crudes. The raffinate from this extraction was the feed in Example IX. Another desirable extract charge for this process is an extract obtained from a distillate of a highly waxy crude, such as Lagomedio, since such extracts contain sufficient wax to cause formation of a waxy film or glass vessels from which samples of such oil are poured. Such a waxy appearance on the walls of a glass vessel can be objectionable to customers who are not aware of the origin of this film.

The present process can also be used to isomerize high melting hydrocarbons present in distillate naphthenic or aromatic crudes in order to upgrade such properties as pour point (or cloud point), viscosity index, etc., of these distillates (or in extracts or raffinates from such distillates).

The preferred lube oil viscosity range feedstocks to the present process are fractions of crudes classified as paraffinic or "mildly naphthenic" by the viscosity-gravity constant (VGC) classification system; that is, the VGC of such a fraction will be in the range of 0.790–0.849. The feed fractions can have been subjected to such additional refining as solvent extraction (e.g., either the raffinate or the extract) can be used in the present process.

In the present application abbreviations of the type "CaNaHY" have been used to indicate alumino-silicate zeolites containing the indicated exchanged cations (i.e., calcium, sodium and "protons") and the "Linde" type of zeolite structure (i.e., Y indicates Linde type Y (as described in U.S. Pat. No. 3,130,007), X is Linde type X, etc. A more precise notation is to indicate the percent of exchange capacity which is satisfied by each cation. For example, 3Na28H69CeY indicates that 3% of the exchange capacity is satisfied by cations of sodium, 69% by cations of cerium and by difference the remainder is hydrogen or protons.

In the preferred alumino-silicate zeolite catalysts, at least 10%, and preferably, at least 40% (typically, 50–80%) of the electronegativity associated with the alumino-silicate framework is satisfied by cations of polyvalent metals or of oxides or hydroxides of such metals. Further preferred is that the zeolite catalyst contains less than one alkali metal cation (e.g., $Na^+$) for every four aluminum atoms in the alumino-silicate framework (more preferred, less than one such cation for every 10 such aluminum atoms). Preferably, the alumino-silicate zeolite is at least 15% crystalline (by X-ray analysis) and is chemically characterized by the empirical formula $M_x(AlO_2)_x(SiO_2)_y(H_2O)_z$, where $x$, $y$ and $z$ are integers, the ratio $x/y$ being from 1.0 to 0.05 and where M is chosen from one of the following groups (or a combination of equivalent valence of members of two or more said groups):

1. a tetravalent, trivalent or divalent metal, metal oxide or metal hydroxide when the atomic ratio Al/Si of said alumino-silicate is greater than 0.65, there being at least one said cation for every 16 atoms of aluminum in the alumino-silicate tetrahedra (or framework) of said zeolite.
2. trivalent or divalent metal, metal oxide or metal hydroxide when the atomic ratio Al/Si of said alumino-silicate is from 0.65 to 0.35, there being at least one said cation for every 12 atoms of aluminum in said framework; and
3. divalent metal, metal oxide or metal hydroxide, when the atomic ratio Al/Si of said alumino-silicate is less than 0.35, there being at least one said cation for every eight atoms of aluminum in said framework.

and wherein the balance of the cations necessary for electronic equivalency comprises $H^+$ or cations of metals, metal oxides, or metal hydroxides and wherein there is less than one alkali metal cation for every four atoms of aluminum in the alumino-silicate zeolite, more preferably, less than one alkali metal cation for every ten atoms of aluminum. This latter requirement can also be considered as requiring that less than 25% (more preferred less than 10%) of the exchange capacity of the zeolite is satisfied by cations of an alkali metal.

The preparation of such zeolites (which contain such polyvalent cations) is well known. A typical procedure comprises aqueous exchange of a sodium form of the zeolite (e.g., Linde Type Y) with polyvalent metal ions (as with an aqueous cerium nitrate). More preferred is to first exchange a sodium faujasite with aqueous ammonium ions until the resulting ammonium zeolite contains less than one cation of sodium for every four atoms of aluminum in the framework (more preferred less than 1 sodium cation for every 10 or 20 atoms of aluminum). The resulting ammonium zeolite can then be exchanged with polyvalent cations to produce the desired zeolite. Upon activation, as by heating in air, water is removed and any residual ammonium ions decompose to form "protonic" or "cation deficient" sites. The symbol $CeNH_4Y$ is sometimes used to denote a predominantly cerium ammonium Y zeolite of low sodium content (of the preferred class referred to herein) and, after activation, the resulting cation deficient zeolite can be denoted as "CeHY" or less precisely, "CeY." However, it should be noted that, depending upon activation conditions, the cerium can be present in a number of cationic forms, e.g., $HOCe^{+2}$ or $Ce^{+3}$, etc., and the hydrogen in the zeolite may be protonic or hydroxyl. Whether in one or a combination of such forms, any polyvalent metal containing zeolite of the type described herein can be useful in the process of this invention.

In general, the ratio $x/z$ in the empirical formula of a zeolite is preferably in the range of 0.25–6. If excess water is present (over that desired for a given reaction), the zeolite can be activated by heating according to the procedure disclosed in the aforementioned applications of Kirsch, Barmby and Potts. If the zeolite is deficient in "bound" water, such water can be added, as by exposure to steam in air or nitrogen.

Operative polyvalent cation-containing zeolites can be those taught in application Ser. No. 716,190 of Kirsch et al. As used herein, the term "framework," in reference to the alumino-silicate portion of the zeolite (which can be crystalline or amorphous), excludes those aluminum ions which are in exchange positions and which are neutralizing some of the negative charge associated with the aluminum atoms in the alumino-silicate tetrahedra of the zeolite. Note that aluminum in the alumino-silicate framework can be either trigonal or tetrahedral.

If, at a given reaction temperature, the catalyst activity appreciably decreases during the course of the reaction, it is sometimes advantageous to add water (e.g., steam) with the feed. An increase in reaction temperature can often be used to prolong effective catalyst life. Alternatively, the catalyst can be separated from the hydrocarbon reactants and regenerated, as by burning in air, or mixtures of air and inert gas such as nitrogen. After such burning, water can be added to the catalyst, as by exposure to hydrogen or to steam in air or nitrogen.

The following table shows the composition in terms of percent of exchange capacity of a number of cerium$^{+3}$ and/or ammonium exchanged Y zeolites (from Ser. No. 716,190) and the composition after activation to decompose the ammonium cations.

| Zeolite As Is | Catalyst After Activation |
|---|---|
| 18 Na 82NH$_4$ | 18Na 82H |
| 11Na 89NH$_4$ | 11Na 89H |
| 3Na 97NH$_4$ | 3Na 97H |
| 9Na 15NH$_4$ 7H 68Ce | 9Na 23H 68Ce |
| 3Na 18NH$_4$ 10H 69Ce | 3Na 28H 69Ce |
| 3Na 48NH$_4$ 49Ce | 3 Na 48H 49Ce |
| 17Na 19NH$_4$ 64Ce | 17Na 19H 64Ce |

All of these catalysts can be considered as decationized zeolites containing exchanged polyvalent metal cations and can be used in the present process, especially if a platinum group metal is also included, as by exchange or impregnation.

Another means of expressing a preferred class of such zeolite compositions is shown in Ser. No. 211,040 and is a formula of the form $M_x(AlO_2)_x(SiO_2)_y(H_2O)_z$ where $f(Na):g(H):h(RE) = Mx$; where $x$, $y$ and $z$ are integers, RE is at least one cation of a rare earth metal, the ratio $x/y$ is in the range of 0.2–1.0, $z$ is in the range of $0-2x$ and $f$, $g$ and $h$ are the percentage cation distributions of sodium, hydrogen and rare earth, and wherein $f$ is in the range of about 0–20, $g$ is in the range of about 10–50 and $h$ is in the range of about 45–70, and the sum of $f$, $g$ and $h$ is about 100.

Another preferred zeolite, which can be activated by heating to make a preferred CeHY catalyst, is expressed as being about $0.1Na_2O:A_2[(NH_4)_2O]:A_3(H_2O):0.7(Ce_{2/3}O):Al_2O_3:4.7SiO_2$, where the sum of $A_2$ and $A_3$ is about 0.2.

All of the above-referred to cerium containing zeolites are especially useful as catalysts in the present process when the contacting is also in the presence of nickel and tungsten (or hydrides, sulfides or oxides thereof). The hydrogenation catalyst can be in or on a separate inert carrier, such as alpha alumina (or an active carrier, such as amorphous silica alumina) and admixed with the zeolite or can be incorporated in or on the same carrier as the zeolite (as by impregnation) or incorporated into the zeolite by impregnation and/or ion exchange.

TABLE I

BATCH HYDROISOMERIZATION WITH Pd-LOADED HYDROGEN FAUJASITE CATALYST--RUN SUMMARY

| Run Number | Charge | 1 | 2 | 3 | 4 | 5 | 6 | Charge | 7 | 8 |
|---|---|---|---|---|---|---|---|---|---|---|
| Charge | ← 3425 → | | | ← Wax → | | | | ← Raffinate Oil* → | | |
| Bomb Volume, cc | | 300 | 300 | 300 | 300 | 1000 | 1000 | | 1000 | 1000 |
| Peak Temperature, °F | | 730 | 315 | 450 | 600 | 500 | 550 | | 550 | 650 |
| Initial Pressure, psig | | 1500 | 3000 | 2000 | 1500 | 1500 | 1500 | | 1500 | 1500 |
| Peak Pressure, psig | | 5000 | 5000 | 3450 | 2850 | 3450 | 2700 | | 2600+ | 2550+ |
| Run Time, Hours # | | 6.0 | 3.5 | 19.5 | 19.0 | 19.0 | 18.5 | | 19.0 | 19.5 |
| Time at Peak Temperature, Hours | | 0.2 | 0.5 | 12.0 | 12.0 | 12.0 | 12.0 | | 12.0 | 12.0 |
| Catalyst, Grams | | 10.4 | 10.0 | 10.0 | 2.5 | 5.0 | 5.0 | | 5.0 | 5.0 |
| Charge, Grams | | 62.8 | 41.0 | 41.0 | 41.0 | 82.0 | 82.0 | | 85.0 | 84.9 |
| Oil Product | Wax | | | | | | | Raff. | | |
| Yield, Weight Percent | | — | — | 3.5 | — | 5.8 | 16.0 | | — | — |
| Solid Point, °F | +125 | 50 | — | — | — | +45 | +35 | +80 | — | — |
| Viscosity, 210°F KV | 3.8 | 1.1 | 3.8 | — | 3.9 | — | 3.8 | 3.9 | 1.1 | — |
| Viscosity, 100°F KV | — | — | — | — | 19.2 | — | — | 19.2 | — | — |
| UV Aromaticity (Wt.%) | 0.6 | 0.03 | 0.00 | 0.03 | 0.03 | 0.03 | 0.04 | | — | — |
| Pour Point | +125 | 50 | 125 | — | −65 | 40 | 30 | | — | — |
| Refractive Index (20°C) | | 1.414 | — | — | 1.416 | — | — | | — | — |
| Specific Gravity | 0.81 | 0.73 | — | — | 0.74 | — | 0.78 | 0.83 | 0.79 | 0.68 |
| Percent Decrease in Specific Gravity | | 9.9 | — | — | 8.7 | — | 3.7 | | 4.8 | 18.1 |

*Contained 12% wax and was obtained by solvent extraction of a paraffinic distillate. Raffinate yield was 79% of charge to extractor.
+In Runs 7 and 8 there was a pressure drop of 300 psig indicating appreciable hydrogen consumption
Including heating and cooling.

TABLE II

PRODUCTION OF LOW PRESSURE SEPARATOR GASES FROM CONTINUOUS PILOT PLANT CONTACT OF WAXY LUBE STOCKS WITH HYDROGEN AND Pd-LOADED ACIDIC ZEOLITE

| Run Number | Feed Stock | Temp °F | Pressure psig | LHSV | Gas Recycle SCF/BBL Feed | LP Gas Yield* SCF/BBL of Feed |
|---|---|---|---|---|---|---|
| 421 | Raffinate | 650 | 500 | 0.5 | None | 470 |
| 422 | do. | 550 | 500 | 2.0 | None | 33 |
| 423 | do. | 550 | 500 | 0.5 | 2500 | 75 |
| 424 | do. | 450 | 500 | 2.0 | 2500 | 24 |
| 425 | do. | 450 | 500 | 0.5 | None | 27 |
| 426 | do. | 650 | 500 | 2.0 | 2500 | 240 |
| 427 | Extract | 450 | 500 | 2.0 | 2500 | 24 |
| 428 | do. | 450 | 500 | 0.5 | None | — |
| 429 | do. | 550 | 500 | 2.0 | None | 69 |
| 430 | do. | 550 | 500 | 0.5 | 2500 | 89 |
| 431 | do. | 650 | 500 | 2.0 | 2500 | 120 |
| 432 | do. | 650 | 500 | 0.5 | None | 110 |
| 433 | do. | 450 | 500 | 2.0 | 2500 | 14 |

*includes hydrogen

The invention claimed is:

1. Process comprising contacting a lube oil boiling range stock containing waxy hydrocarbons with a catalyst comprising an acidic partially decationized crystalline alumino-silicate zeolite at a liquid hourly space velocity, in the range of 0.1–10.0, based on the fresh feed and the crystalline zeolite content of the catalyst, and hydrogen pressure in the range of 400 to 6,000 psi, at a gas recycle rate in the range of 0 to 20,000 scf/bbl of fresh feed and at a temperature in the range of of fresh feed and at a temperature in the range of 350° to 675° F, said space velocity, pressure, temperature and recycle conditions being selected so as to attain conversion of at least about 6% of said waxy hydrocarbon to oils in the lubricating oil viscosity range and wherein less than 15 volume percent of said feed is converted to materials boiling below 600° F, and wherein less than 25% of the exchange capacity of said zeolite is satisfied by alkali metal cations.

2. Process according to claim 1 wherein said conditions are selected so as to attain said conversion with no appreciable conversion of said waxy hydrocarbons to materials of lower carbon number.

3. Process according to claim 1 wherein said temperature is in the range of 550° to 650° F and wherein less than 10% of the waxy hydrocarbon which is so contacted is converted to hydrocarbons boiling below 600° F.

4. Process according to claim 1 wherein said zeolite contains less than 0.1 weight percent halide ions.

5. Process according to claim 2 wherein said temperature is in the range of 500° to 575° F.

6. Process according to claim 2 wherein said temperature is in the range of 520° to 560° F.

7. Process according to claim 1 wherein said waxy hydrocarbons are contained in a distillate oil having a viscosity at 100° F in the range of 35–10,000 SUS, a viscosity-gravity constant in the range of 0.78–0.85 and wherein the concentration of wax in said distillate is less than 50 weight percent and wherein said contact temperature is no greater than 650° F.

8. Process according to claim 7 wherein said wax concentration is less than about 20% and wherein said temperature is no greater than 550° F and wherein said contacting is at a liquid hourly space velocity in the range of 0.5 to 5.

9. Process of claim 1 wherein at least 10% of the exchange capacity of said zeolite is satisfied by cations of a polyvalent metal.

10. Process of claim 8 wherein said polyvalent metal is selected from lanthanum and the rare earths.

11. Process according to claim 1 where said waxy hydrocarbons are contained in a raffinate oil obtained by solvent extraction of a distillate oil having a viscosity at 100° F in the range of 35–10,000 SUS.

12. Process according to claim 1 wherein said contacting is also in the presence of a metal hydrogenation catalyst or a hydride, oxide or sulfide thereof.

13. Process according to claim 12 wherein said metal is nickel, tungsten or a mixture thereof.

14. Process according to claim 1 wherein said alumino-silicate zeolite catalyst is combined with a hydrogenation catalyst, and wherein said catalyst combination includes at least one metal, oxide or sulfide of at least one metal selected from the group consisting of nickel, cobalt, molybdenum, tungsten, platinum, palladium, rhenium and ruthenium.

15. Process according to claim 1 wherein said waxy hydrocarbons are contained in an oily feed stock which contains less than 50 weight percent of wax and wherein less than 75 scf of $C_1$–$C_5$ hydrocarbon gases are produced, in a single pass through a reactor, for each barrel of fresh feed stock.

16. Process according to claim 1 wherein less than 35 scf of $C_1$–$C_5$ hydrocarbon gases are produced, in a single pass through a reactor, for each barrel of fresh feed stock.

17. Process according to claim 1 wherein the framework of said zeolite has a ratio Al/Si in the range of 0.35–0.65 and wherein in the range of 10–60% of the exchange capacity of said zeolite is satisfied by protons.

18. Process according to claim 13 wherein at least 40% of the exchange capacity of said zeolite is satisfied by cations of cerium III.

19. Process according to claim 1 wherein at least 90% of the feed to said process boils above 600° F.

20. Process according to claim 1 wherein at least 95% of the feed to said process boils above 700° F.

21. Process for increasing the yield of lower SUS viscosity, at 100° F, distillate fractions in a straight run distillate oil having a viscosity-gravity constant in the range of 0.83–0.94 and a viscosity at 100°F in the range of 200–12,000 SUS, said process comprising contacting said distillate oil with a catalyst comprising an acidic partially decationized crystalline aluminosilicate zeolite at a liquid hourly space velocity in the range of 0.1–10.0, based on the fresh feed and the crystalline zeolite content of the catalyst, and hydrogen pressure in the range of 400–6,000 psi, at a gas recycle rate in the range of 0–20,000 scf/bbl of fresh feed and at a temperature in the range of 350°–675° F, said space velocity, pressure, temperature and recycle conditions being selected so as to convert at least 16 weight percent of said feed to lower viscosity oils and with less than 15 weight percent conversion of said feed to materials boiling below 600° F.

22. Process of claim 21 wherein said zeolite is a rare earth exchanged synthetic faujasite.

23. Process of claim 22 wherein the contacting is also in the presence of a hydrogenation catalyst containing cobalt, nickel, molybdenum, tungsten or a hydride, sulfide or oxide thereof or a mixture of such hydrogenation catalysts.

24. Process of claim 21 wherein said straight run distillate oil contains waxy hydrocarbons and wherein at least 6% of said waxy hydrocarbons are converted to oils in the lubricating oil boiling range.

* * * * *